(12) United States Patent
Sundermeyer et al.

(10) Patent No.: US 7,941,748 B1
(45) Date of Patent: May 10, 2011

(54) SYSTEMS AND METHODS FOR WEB SITE EDITING INTERFACES

(75) Inventors: Michael J. Sundermeyer, Palo Alto, CA (US); Narciso B. Jaramillo, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1620 days.

(21) Appl. No.: 10/690,214

(22) Filed: Oct. 21, 2003

(51) Int. Cl.
G06F 17/00 (2006.01)
(52) U.S. Cl. ......... 715/255; 715/273; 715/744; 707/627
(58) Field of Classification Search .................. 715/530, 715/255, 273, 744; 707/627
See application file for complete search history.

(56) References Cited

U.S. PATENT DOCUMENTS

| | | | |
|---|---|---|---|
| 5,572,643 A | 11/1996 | Judson | |
| 5,778,389 A | 7/1998 | Pruett et al. | |
| 5,892,908 A | 4/1999 | Hughes et al. | |
| 6,012,071 A | 1/2000 | Krishna et al. | |
| 6,061,692 A | 5/2000 | Thomas et al. | |
| 6,061,697 A | 5/2000 | Nakao | |
| 6,078,929 A | 6/2000 | Rao | |
| 6,145,003 A | 11/2000 | Sanu et al. | |
| 6,148,289 A | 11/2000 | Virdy | |
| 6,167,453 A | 12/2000 | Becker et al. | |
| 6,385,606 B2 | 5/2002 | Inohara et al. | |
| 6,393,420 B1 | 5/2002 | Peters | |
| 6,516,337 B1 | 2/2003 | Tripp et al. | |
| 6,519,626 B1 | 2/2003 | Soderburg et al. | |
| 6,626,957 B1 | 9/2003 | Lippert et al. | |
| 6,629,127 B1 | 9/2003 | Deen et al. | |
| 6,823,478 B1 | 11/2004 | Prologo et al. | |
| 6,944,658 B1 | 9/2005 | Schneider | |
| 6,959,288 B1 | 10/2005 | Medina et al. | |
| 6,985,936 B2 | 1/2006 | Agarwalla et al. | |
| 6,990,629 B1 | 1/2006 | Heaney et al. | |
| 7,032,000 B2 | 4/2006 | Tripp | |
| 7,062,506 B2 | 6/2006 | Taylor et al. | |
| 7,086,050 B2 | 8/2006 | Barton et al. | |
| 7,117,504 B2 | 10/2006 | Smith et al. | |
| 7,213,201 B2 | 5/2007 | Brown et al. | |
| 7,263,534 B1 | 8/2007 | Margulis | |
| 7,269,664 B2 | 9/2007 | Hutsch et al. | |
| 7,281,060 B2 | 10/2007 | Hofmann et al. | |
| 7,287,227 B2* | 10/2007 | Ries et al. ..................... | 715/741 |
| 7,448,032 B2 | 11/2008 | Boubonnais | |

(Continued)

OTHER PUBLICATIONS

Kim, L., "XML Spy, XML Integrated Development Environments, Accelerating XML Application Development in the Enterprise," Altova Inc. & Altova GmbH, 2002, published on the Internet as of Aug. 21, 2002, from link to: http://web.archive.org/web/20020802160016/www.www.xmlspy.com/resources_wp.html, downloaded pp. 1-20.*

(Continued)

Primary Examiner — Stephen S Hong
Assistant Examiner — Matthew J Ludwig
(74) Attorney, Agent, or Firm — Kilpatrick Townsend & Stockton LLP

(57) ABSTRACT

A system and method for maintaining a Web site is disclosed that includes browsing to a Web page to be edited, automatically downloading a source file for the Web page including related files associated with display of the Web page, editing the source file, and automatically publishing the edited source file to a file transfer server associated with the Web site including the related files associated with the display of the Web page.

8 Claims, 6 Drawing Sheets

U.S. PATENT DOCUMENTS

| | | | |
|---|---|---|---|
| 7,457,805 | B2 | 11/2008 | Deen et al. |
| 7,480,910 | B1 | 1/2009 | Kuwamoto et al. |
| 2001/0002470 | A1 | 5/2001 | Inohara et al. |
| 2002/0023112 | A1 | 2/2002 | Avital |
| 2003/0023632 | A1 | 1/2003 | Ries et al. |
| 2003/0061278 | A1 | 3/2003 | Agarwalla et al. |
| 2003/0167317 | A1 | 9/2003 | Deen et al. |
| 2003/0220924 | A1 | 11/2003 | Bourbonnais |
| 2004/0177321 | A1 | 9/2004 | Brown et al. |

OTHER PUBLICATIONS

GlobalScape, "CuteFTP Pro Technical Overview," White Paper, May 22, 2001, published on the internet at least by Aug. 14, 2002 from: http://web.archive.org/web/20020814133509/www.globalscape.com/support/manuals.shtml, pp. i-ii and 1-17.*

Altova Inc. & Altova GmbH, "XML Spy 4.0 Manual," copyright 1998-2001, Sep. 10, 2001, Chapter 3, consisting of pp. 91-286.*

GlobalScape, "CuteFTP Pro, User's Guide," published on the Internet as of Aug. 14, 2002, from link to: http://web.archive.org/web/20020814133509/www.globalscape.com/support/manuals.shtml, downloaded pp. 1-108.*

XIASOFT, "Streamlining content creation, retrieval, and publishing on the Web, Using TEXTML Server and XML Spy 4 Suite in an integrated, Web publishing environment," White Paper, Jul. 2002, pp. 1-16.*

Altova Inc. & Altova GmbH, "XML Spy 4.0 Manual," copyright 1998-2001, Sep. 10, 2001, Chapter 3, consisting of pp. 91-286, previously provided to Applicants.*

GlobalScope, "CuteFTP Pro Technical Overview," White Paper, May 22, 2001, downloaded from:http://web.archive.org/web/20020814133509/www.globalscape.com/support/manuals.shtml, pp. i-ii and 1-17, previously provided to Applicant.*

U.S. Appl. No. 10/689,860, Darrick P. Brown.

U.S. Appl. No. 10/689,870, Joshua K. Margulis.

U.S. Appl. No. 10/690,980, Sundermeyer et al.

Office Action dated Nov. 8, 2005 in related U.S. Appl. No. 10/690,980.

Office Action dated Feb. 27, 2006 in related U.S. Appl. No. 10/690,980.

Office Action dated Jul. 27, 2006 in related U.S. Appl. No. 10/690,980.

Office Action dated Dec. 15, 2006 in related U.S. Appl. No. 10/690,980.

Examiner's Answer to Appeal Brief dated Jul. 30, 2007 in related U.S. Appl. No. 10/690,980.

Decision of BPAI dated Jul. 31, 2009 in related U.S. Appl. No. 10/690,980.

Office Communication dated Nov. 6, 2009 in related U.S. Appl. No. 10/690,980.

Office Action dated Oct. 18, 2006 in related U.S. Appl. No. 10/689,870.

Notice of Allowance dated Apr. 23, 2007 in related U.S. Appl. No. 10/689,670.

Office Action dated May 16, 2007 in related U.S. Appl. No. 10/689,860.

Office Action dated Nov. 1, 2007 in related U.S. Appl. No. 10/689,860.

Interview Summary dated Mar. 6, 2008 in related U.S. Appl. No. 10/689,860.

Office Action dated May 5, 2008 in related U.S. Appl. No. 10/689,860.

Office Action dated Oct. 31, 2008 in related U.S. Appl. No. 10/689,860.

Office Action dated Aug. 19, 2009 in related U.S. Appl. No. 10/689,860.

Notice of Allowance dated Feb. 5, 2010 in U.S. Appl. No. 10/689,860.

U.S. Appl. No. 11/019,101, filed Dec. 21, 2004.

Office Action dated Feb. 5, 2009 in related U.S. Appl. No. 11/019,101.

Office Action dated Oct. 15, 2009 in related U.S. Appl. No. 11/019,101.

Advisory Action dated Dec. 30, 2009 in related U.S. Appl. No. 11/019,101.

U.S. Appl. No. 11/841,428, filed Aug. 20, 2007.

Office Action dated Jul. 21, 2009 in related U.S. Appl. No. 11/841,428.

Office Action dated Jan. 27, 2010 in related U.S. Appl. No. 11/841,428.

Berners-Lee, et al., "RFC 1738—Uniform Resource Locations (URL)"—Dec. 1994.

Dreamweaver TechNote 16416, "How to make an inherited editable region uneditable," Jul. 6, 2002, p. 1-4.

Macromedia Dreamweaver MX: Training from the Source, published Jul. 23, 2002, Safari Tech Books Online version, http://proquest.safaribooksonline.com, p. 1-39.

Fraternali, P., "Tools and Approaches for Developing Data-Intensive Web Applications: A Survey," ACM Computing Surveys, vol. 31, Issue 3, Sep. 1999, p. 227-263.

Final Office Action mailed Jul. 22, 2010 in related U.S. Appl. No. 11/019,101.

Notice of Allowance mailed Aug. 27, 2010 in related U.S. Appl. No. 11/841,428.

* cited by examiner

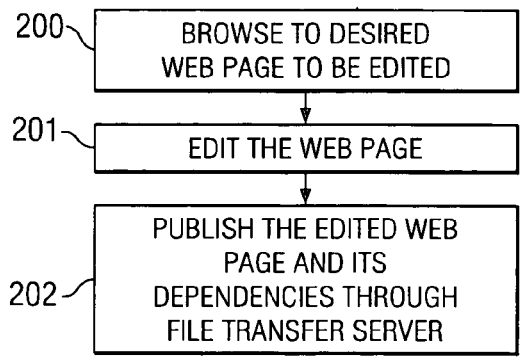
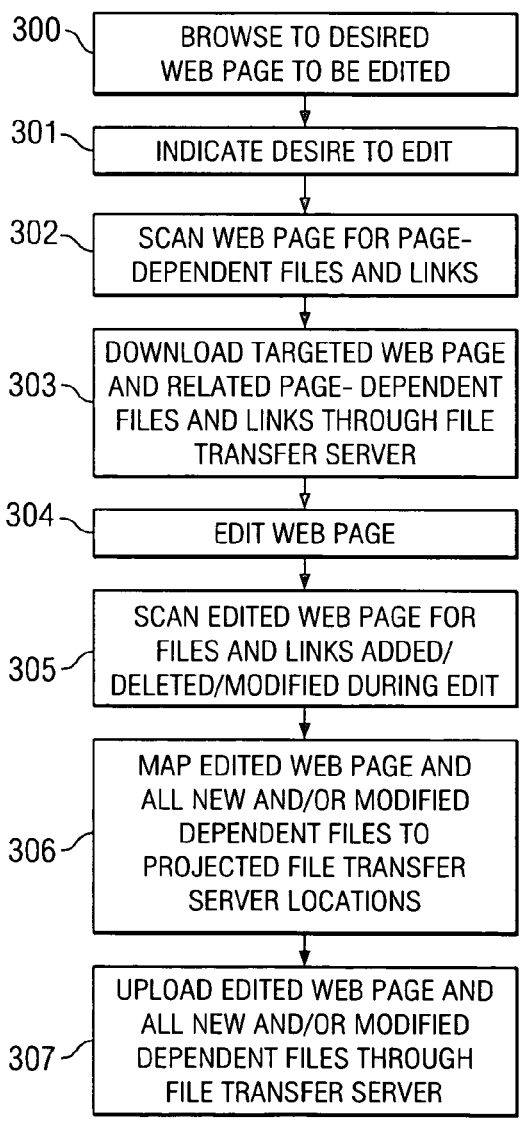
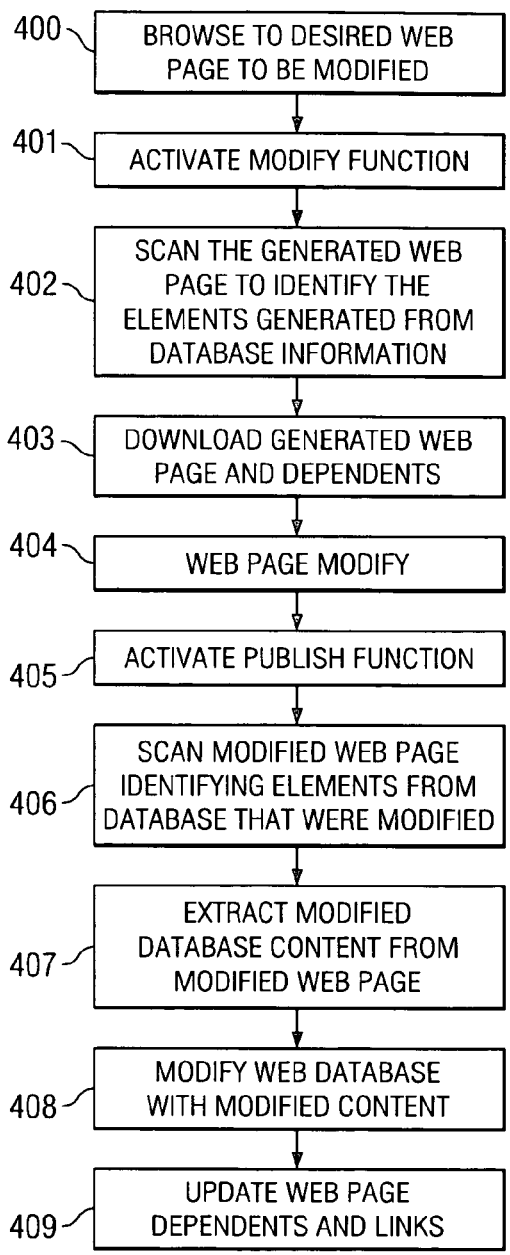

SYSTEMS AND METHODS FOR WEB SITE EDITING INTERFACES

CROSS-REFERENCE TO RELATED APPLICATIONS

The present application is related to concurrently-filed, co-pending, and commonly assigned U.S. patent application Ser. No. 10/690,980, entitled, "CONTENT-RESTRICTED EDITING;" U.S. patent application Ser. No. 10,689,870, entitled, "AUTOMATIC SET UP FOR EDITING A WEB SITE;" and U.S. patent application Ser. No. 10/689,860, entitled, "CROSS-PROTOCOL URL MAPPING," filed Oct. 21, 2003, the disclosures of which are hereby incorporated herein by reference.

TECHNICAL FIELD

The present invention relates, in general, to Web site development, and, more specifically, to a Web site management lifecycle.

BACKGROUND OF THE INVENTION

Companies typically use the World Wide Web to disseminate information both internally, to employees and contractors, and externally, to customers and business partners. This information is usually generated by content contributors or subject matter experts (SMEs), who are typically people with expertise in the information domain, but who are not usually technically skilled. In order to publish this information to the Web, or edit the existing information already on a company Internet or Intranet Web site, SMEs typically work with technically skilled Web professionals or Web developers, who generally combine Web coding or computer programming skills and graphics design and presentation skills. Skilled Web professionals or Web developers are an expensive and limited resource. Moreover, multiple Web professionals or developers may be used to obtain expertise in both the coding and graphic arts.

Web sites and Web pages typically comprise a Web server, that serves the visual and data content to the user's browser many times in a format, such as hypertext markup language (HTML), and a file transfer server, that provides read and write-access to the files that make up the visual and data content of the Web sites. While Web servers and file transfer servers are usually conceptualized as separate and independent machines, they, in fact, are typically software applications, which often time run on the same computer. The underlying Web files are usually stored on that computer or a storage device accessible by that computer, while the Web server and file transfer server interact with those files in different ways. Web servers typically allow read-only access to the files through HTML browsers, compared to the read/write-access usually allowed by the file transfer servers. Because file transfer servers typically allow read/write-access to Web files, general or non-skilled users are not typically given access because changing files through the file transfer server will usually change how those corresponding Web pages are served to the accessing browsers. Web professionals spend a great deal of time designing the core of the Web sites by using specific formatting or style sheets, relational dependencies between linked documents or pages, and the coding that creates dynamic Web experiences. Thus, full access to the inner workings of such Web sites and pages is usually limited to the technically-savvy Web developers to preserve the stability and operation of the Web site. In such cases, even where only minimal changes to the content or information is contemplated, the SMEs typically still work with the Web developers to implement those information changes. However, this solution is quite expensive relative to the amount of changes contemplated.

Alternatively, eschewing the dangers, SMEs may be given access to the file transfer server to make information changes. Existing Web development environments, such as MACROMEDIA, INC.'S DREAMWEAVER™, MICROSOFT CORPORATION'S FRONTPAGE™, and the like, allow anyone, including SMEs, to edit and eventually publish Web pages by themselves. However, these Web development environments are typically created for the technically knowledgeable Web developers, and, therefore, may be too technically complicated for SMEs to use easily or successfully. The existing Web development environments generally assume that the users know (1) where the underlying Web files are located in the file structure of the Web site; (2) how to configure the various protocols, such as file transfer protocol (FTP), secure FTP (SFTP), local area network (LAN), and the like, typically used to store and access those Web files; and (3) how to manage the uploading and downloading of the Web files. SMEs and other non-technical users typically do not have the technical knowledge or skill to find or successfully use this information.

Interaction between the file transfer server and the Web server is not always a direct one-to-one correspondence. In non-dynamic Web sites, a one-to-one correspondence typically exists between files accessed through the file transfer server and the URLs accessed through the Web site. In dynamic Web sites, a uniform resource locator (URL) may map to a differently-named or located file on the file transfer server. The file transfer server is typically run using a specific transfer protocol, such as FTP, SFTP, LAN, or the like. While the Web server delivers HTML content to requesting browsers, it uses hypertext transfer protocol (HTTP) to transfer the requests and resulting HTML content between the user's browser and the Web server. Even though both FTP and HTTP are both transfer protocols, they are designed for different purposes and are not necessarily compatible.

For example, the file management system for HTTP will generally be different than that of FTP. HTTP is designed for more limited, yet ready access than FTP. HTTP communications revolve around establishing communication between a browser and a Web server in which HTML documents and any supporting documents that correspond to an HTTP request are transmitted from the Web server (sometimes called an HTTP server) to the browser to be rendered to the user. An example HTTP request is: http://www.macromedia.com/index.html. The example request would likely be entered by a user into a Web browser. The http:// indicates the request is an HTTP request. The www.macromedia.com indicates the specific Web server domain to which the request is directed. Index.html is the specific file requested for display. Upon receiving this request, the Web server would typically communicate a read-only HTML file to the requesting browser for display. If a user were to enter a bare directory URL, such as http://www.macromedia.com/, an HTTP server would resolve the directory to the index file.

In contrast, FTP includes functions for logging onto the network, listing directories, copying files, and the like. An example FTP command is: ftp://user:password@ftp.macromedia.com. When entered in a browser, the ftp:// indicates that the request is an FTP request. The ftp.macromedia.com is the name of the FTP domain that the user wishes to log onto, and the user:password section is the user's password entry for logging onto the FTP server. Once logged on, the user can download and store files, view directories of the files on the FTP server and the like, depending, in general, on the level of authorization the particular user has for that particular FTP server. However, if the user were looking for the index.html file from the HTTP example, it would likely not be found if the user attempted to access ftp.macromedia.com/index.html. In actual use, the root directory of the file transfer server for www.macromedia.com would likely not be found in ftp://ftp.macromedia.com. For security reasons, the root directory would likely be found in a directory with a dissimilar name. The user would generally need to obtain the FTP path that corresponds to that particular Web site. Furthermore, if a bare directory address were entered, such as ftp://ftp.macromedia.com/, an FTP server will usually not resolve the requested directory to access the index file, as with the HTTP server.

In order to access the FTP server, a Web designer or developer is generally prompted by the server access application to provide the FTP host name, the FTP login, the FTP password, and the FTP path. While the FTP host name, login, and password are usually the pieces of information that will get the user onto the FTP server, without the FTP root path name, a user will not likely find the location on the FTP server where the underlying Web files are located. For most experienced designers or developers all of this information is relatively easy to know and/or obtain. A novice or non-technical user, such as a typical SME, may know the FTP host name, login, and password, but would generally not know the FTP root path; and, without the root path, the FTP server will generally not allow access to the appropriate file locations. Most novice users typically do not have even a basic knowledge of how URLs map to FTP paths. The Web master that manages the Web site could give this information to the SMEs. However, they are typically reluctant to do so since the possibilities for the SME to corrupt the Web site are usually great. Without knowledge of the FTP server system, it would be difficult for an SME to understand the location of the underlying Web files, and, thus, how to configure the various protocols or manage the uploading and downloading of the edited Web files. Having the Web developers assist in information updates or creating a customized system for updating information each offer expensive solutions to the Web development lifecycle.

In order to increase the ease of Web development and maintenance, Web development environments have advanced to automate or abstract some of the more technically oriented tasks involved in Web design and publishing. NETSCAPE COMMUNICATIONS CORPORATION's COMPOSER™ implemented a browse-edit paradigm of Web maintenance. Most individuals are comfortable and experienced with the concept and act of browsing. Using COMPOSER™, a user could browse to a particular Web page that he or she desired to edit and click an "Edit Page" button to edit the underlying Web source file. If all of the authorizations and addresses were previously set up, COMPOSER™ would open a separate window with the underlying source file of that Web page. The user could then edit that file and save it locally for possible uploading back to the Web site through its FTP. MICROSOFT CORPORATION's INTERNET EXPLORER™ also includes a version of the browse-edit paradigm. On selection of an "Edit in FrontPage" button, INTERNET EXPLORER™ starts an instance of MICROSOFT CORPORATION's FRONTPAGE™ in a separate window with the Web page file to be edited, again, if the authorizations and file addresses were already set up in advance. Both of these Web development environments allow the user to edit the Web page and store it locally for future action. However, in order to upload the modified Web page to the Web site, the file still needs to be communicated to the Web site through its file transfer server, typically by a Web developer. Therefore, while the browse-edit paradigm streamlines the editing process, the limited amount of editing available to the SME still needs to be uploaded by a Web professional.

Moreover, the browse-edit paradigm, of COMPOSER™ and FRONTPAGE™, provides a solution for simple Web pages that do not have complex dependencies and links. These development environments are not capable of automatically handling the complex document dependencies and links found in most Web pages. Furthermore, COMPOSER™ and FRONTPAGE™ typically may only edit existing pages in the browse-edit paradigm implementation. Because of their deficiencies in handling the links and dependencies, when pages are added or deleted to a Web site, COMPOSER™ and FRONTPAGE™ generally do not automatically update and amend the dependencies and links of the other related pages in the Web site that may need to be updated to either add the new page or delete references to the deleted page. The browse-edit paradigm practiced by COMPOSER™ and FRONTPAGE™ simply does not have the capability to modify Web pages other than the actual page being edited.

BRIEF SUMMARY OF THE INVENTION

The limitations of the browse-edit paradigm are addressed by the Web site management lifecycle described herein. A page editing interface is provided to a user that allows the user to seamlessly browse to a Web page to be edited, edit that page, including any page-dependant files or links, and publish the edited Web page back through the file transfer server without requiring fore knowledge of the file transfer filing system. Each stage of the Web site management lifecycle is presented seamless to the user. The browser embedded in the page editor seamlessly morphs to the edit window, appearing to the user to be a single interface environment. Similarly, when the user publishes the edited content back to the Web site, the edit window seamlessly morphs back to the browser, which then displays the edited Web page to the user through the Web server.

Page-related dependencies, such as linked files and images, are maintained within the page editor in addition to the source code of the Web page to be edited. In this manner, the dependencies may be maintained throughout the edits. Also, the dependency management allows users to add and subtract entire Web pages or dependent files by implementing a process for the page editor to update the links to the new or deleted files.

The Web site management lifecycle includes at its core the ability to automatically map the edited files and their dependents to and from the user's local computer and between the Web server and file transfer server. This mapping allows the user to automatically download the source files for the Web site and its dependencies to be edited and then automatically publish the edited results back to the appropriated locations through the file transfer server associated with the Web site. By including each of the capabilities in the single, seamless page editor, each stage of the Web site management lifecycle is addressed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 is a flowchart illustrating the core steps executed in the implementation of an embodiment of the present invention;

FIG. 3 is a flowchart illustrating example steps executed in implementing another embodiment of the present invention;

FIG. 4 is a flowchart illustrating example steps executed in implementing an additional embodiment of the present invention.

DETAILED DESCRIPTION OF THE INVENTION

The browse-edit paradigm may be greatly improved by adding an automated publish functionality. A browse-edit-publish paradigm solves the problem of mapping the edited Web page back to the Web site through the file transfer server. One method for solving this file transfer mapping involves technology developed by MACROMEDIA, INC. Automatic initial discovery of the file transfer root directory for a particular Web site is disclosed in concurrently-filed, commonly-owned U.S. patent application Ser. No. 10,689,870, entitled, "AUTOMATIC SET UP FOR EDITING A WEB SITE," the disclosure of which is hereby incorporated herein by reference. The protocol mapping process between the source files as accessed through a Web server to the source files accessed through a file transfer server is disclosed in concurrently-filed, commonly-owned U.S. patent application Ser. No. 10/689,860, entitled, "CROSS-PROTOCOL URL MAPPING," the disclosure of which is hereby incorporated herein by reference. The browse-edit-publish paradigm is also enhanced by making the process seamless to the user and handling each of the dependencies for the edited Web pages. The creation of a seamless interface and dependent file-handling allows the user to maintain the familiarity with the browsing process, while controlling the whole process of Web site maintenance. Therefore, the embodiments of the present invention extend beyond a browse-edit-publish paradigm to a Web site management lifecycle.

Figure 1A:
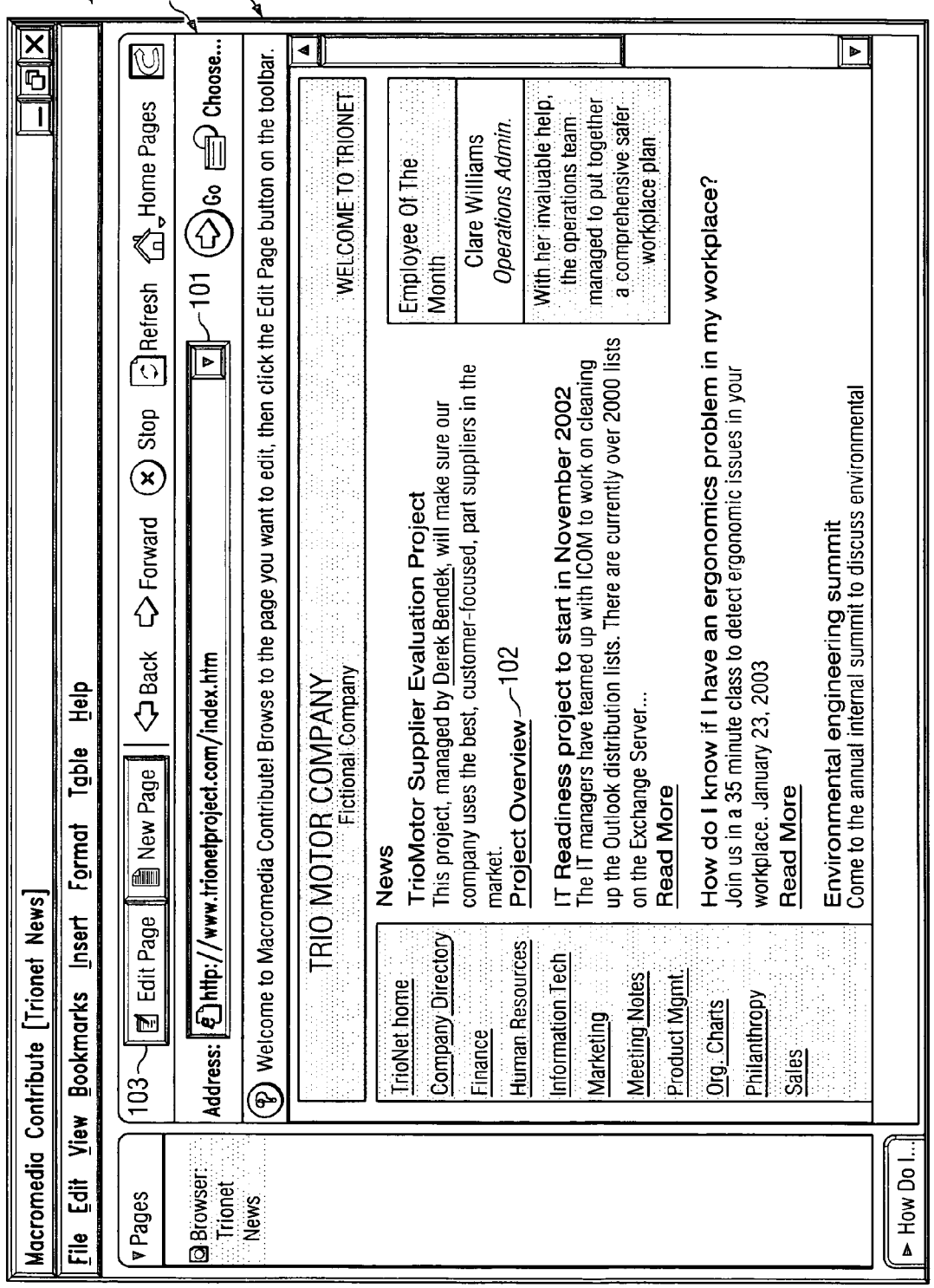
FIGS. 1A-1D are screen shots illustrating one embodiment of the present invention.

FIG. 1A is a screen shot illustrating one embodiment of the present invention. Page editor 10 is implemented with browser 100. A user may browse, using familiar tasks, to any desired Web site using a search engine or by entering a uniform resource locator (URL), such as URL 101, which identifies the main page of the Web site, index.htm. Browser 100 includes the typical browser functionality, including the linking capabilities offered with HTTP, but also includes additional features as illustrated by edit button 103. Link 102 is displayed as a typical hyperlink, as may be familiar to the user. For purposes of this example, the user intends to edit the Web page linked to by link 102. By actuating link 102, browser 100 requests the associated page for display.

Figure 1B:
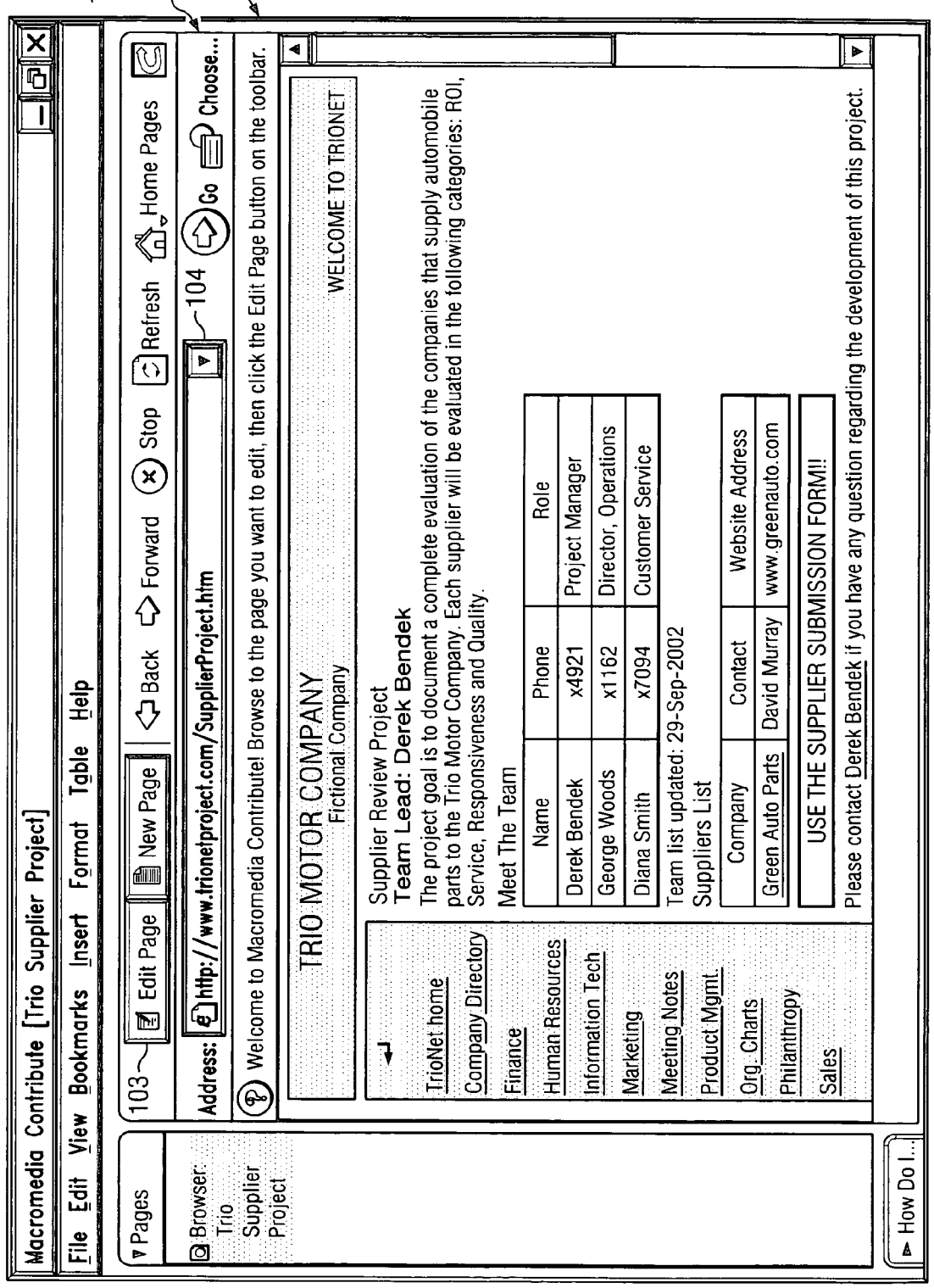

FIG. 1B is a screen shot illustrating page editor 10 displaying the Web page associated with link 102 of FIG. 1A. Browser 100 now displays the page which the user desires to edit. URL 104, http://www.trionetproject.com/SuppliersProject.htm, identifies the location of the Suppliers Project page according to the Web server's file system. The user may begin the editing of the displayed Web page by clicking edit button 103.

Figure 1C:
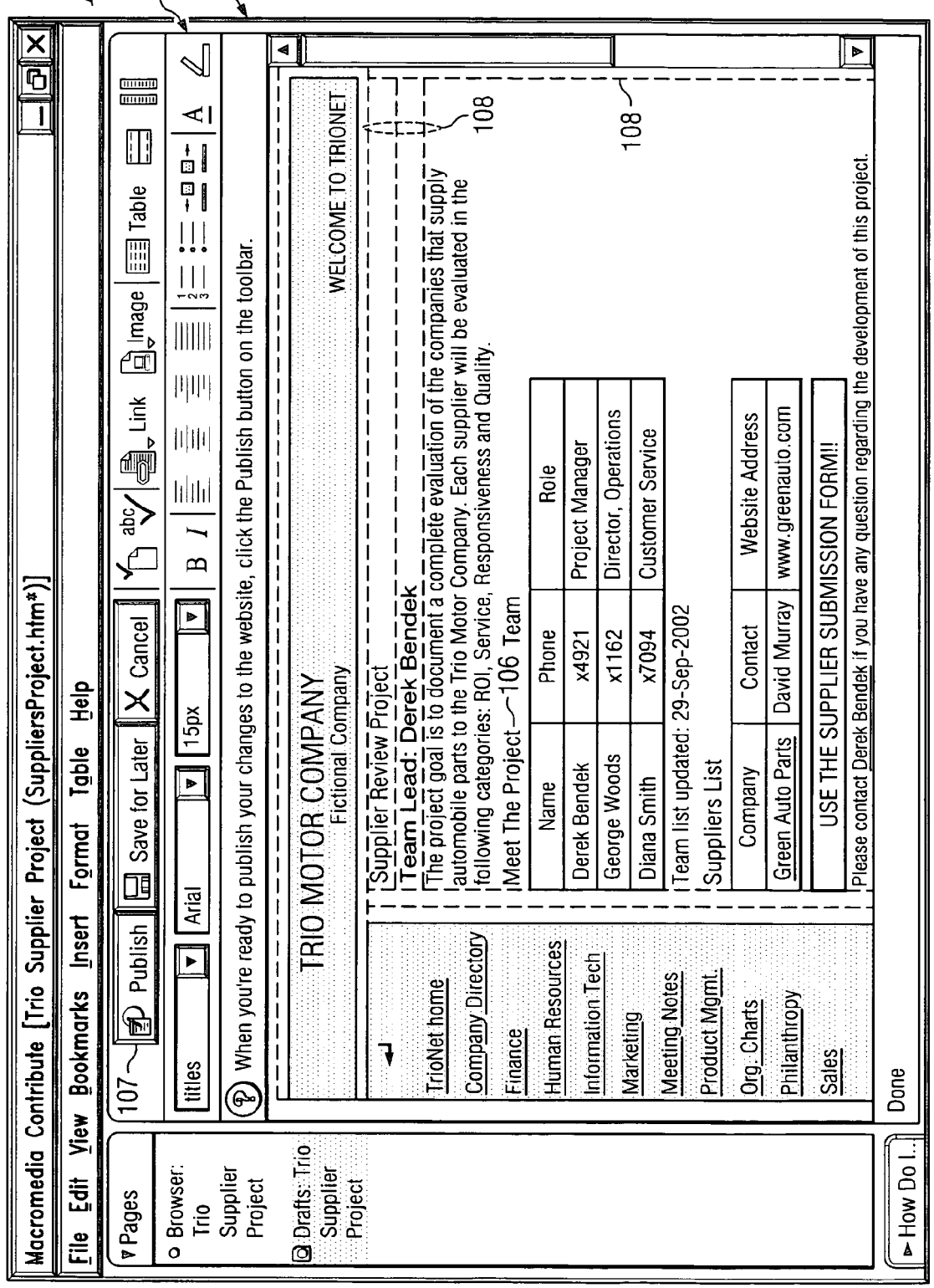

FIG. 1C is a screen shot illustrating page editor 10 in an edit mode. Editing window 105 is actually a different window from browser 100. However, to the user, it appears that editing window 105 is merely a slight modification of browser 100. Editing window 105 is coded to appear over browser 100, giving the appearance that one window morphed into another, or that the same window was slightly modified. This seamless progression to editing window 105 preserves the users familiarity with the browsing concept. Other visual indicators displayed to the user include field lines 108, identifying the several fields, slices, or sections of the Web page and the changes in the toolbar, including the addition of publish button 107. In the illustrated embodiment, the user may modify any of the content within editing window 105. FIG. 1C shows that the user added text 106 to the previous, "Meet The Team" title. When the user is finished editing the Web page, he or she may click on Publish button 107 to upload the edited file back to the Web site through the file transfer server.

It should be noted that various embodiments of the present invention may safeguard the design and formatting of the Web site by restricting the editing ability of the user to only the content or textual information. Moreover, any new documents created by a user may be constrained to the formatting sequence or particular cascading style sheets (CSS). Thus, when a new document is created by the user, it automatically comes up pre-formatted to the specific formatting sequence of CSS used by the rest of the Web site, much like a template. One method for implementing these safeguard restrictions is disclosed in concurrently-filed, commonly-owned U.S. patent application Ser. No. 10/690,980, entitled, "CONTENT-RESTRICTED EDITING," the disclosure of which is hereby incorporated herein by reference.

Figure 1D:
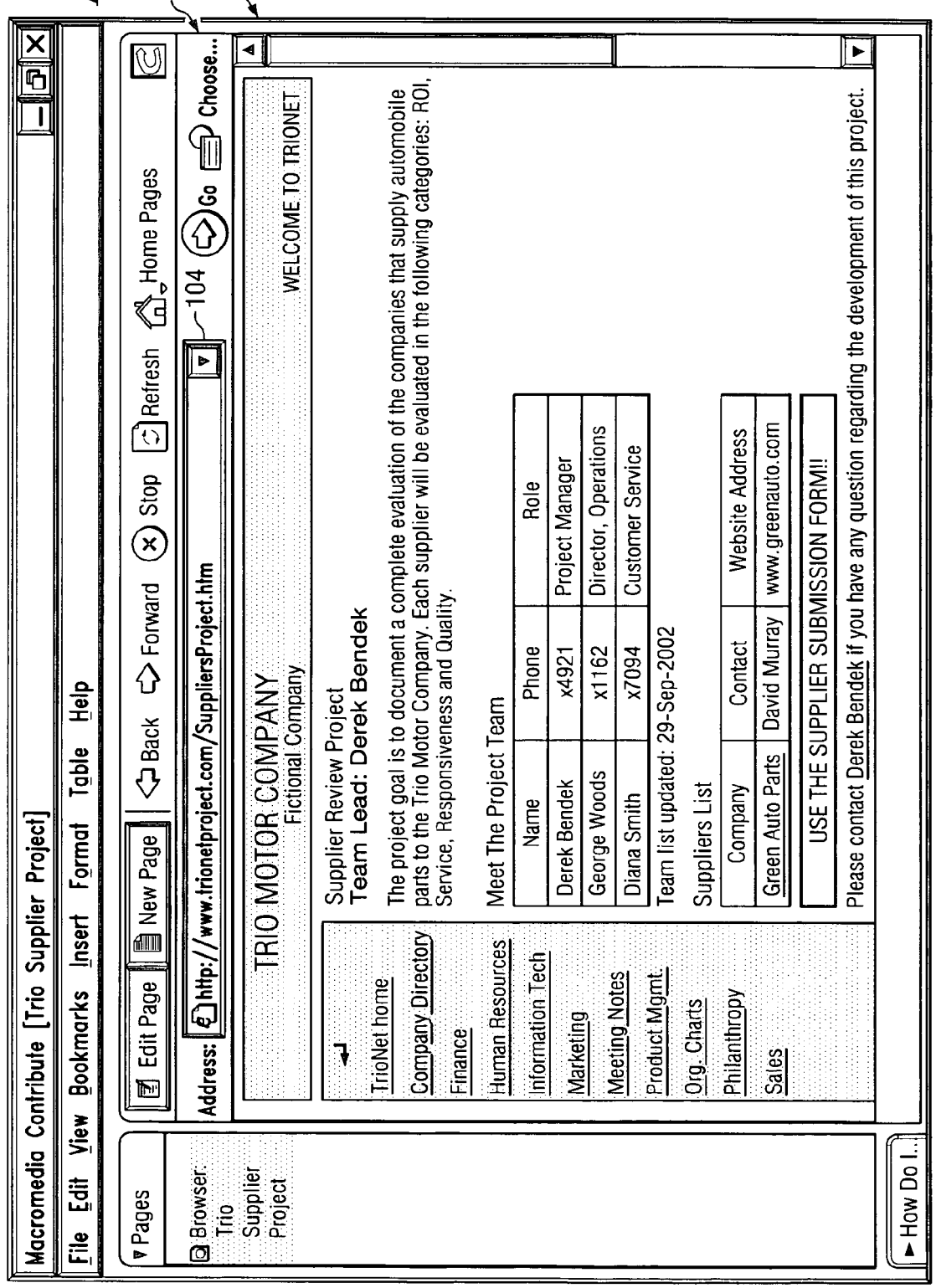

FIG. 1D is a screen shot illustrating page editor 10 displaying the edited Web page in browser 100. After activating Publish button 107 (FIG. 1C), page editor 10 seemingly morphs back to browser 100, again giving the user the impression that the edit-publish process is seamless. The newly edited Web page at URL 104 is now displayed with the edits in place.

While previous Web development environments have included tools to assist in the publishing of the edited Web content, none have been capable of automatically browsing, editing, and then publishing the edited Web content in a seamless interface. Moreover, previous Web development environments have been incapable of handling the dependent file relationships of edited Web pages. FIG. 2 is a flowchart illustrating the core steps executed in the implementation of an embodiment of the present invention. In step 200, the user browses to the desired Web page to be edited in the same, well-understood manner used in typically Web browsers. In step 201, the user edits the Web page by activating the editing feature and making the modifications. In step 202, after the user is finished editing, he or she may publish the edited Web page and each of its dependencies through the file transfer server of the Web site.

FIG. 3 is a flowchart illustrating example steps executed in implementing another embodiment of the present invention. In step 300, the user browses to the Web page to be edited. In step 301, the user indicates the desire to edit the page. Upon the edit indication, the system scans the target Web page, in step 302, to identify any page-dependent files or links. Page-dependent files or links are those files or documents that may be used to display the target Web page. For example, a Web page may contain images that are, in reality, stored in a separate location, with only a reference to that location contained as a link within that Web page. These page-dependent files are generally downloaded to ensure that Web page displays correctly in the page editor's embedded Web browser. Additionally, some Web pages have dynamic content. Therefore, the page-dependent files or links may be links to the associated databases for retrieving the dynamic information.

Once the target Web page has been scanned, the underlying source file for the target Web page is downloaded via the file transfer server in step 303, along with any of the related, page-dependent files or links. The user may then edit the Web page in step 304. Once the edits have been complete, and the user indicates to publish the edited Web page, the edited file is scanned once again, in step 305, for any page-dependent files or links that may have been modified, added, or deleted during the editing process. In step 306, the source file for the edited Web page along with any of its dependencies that were modified or that are not already on the file transfer server are mapped to the filing system hierarchy of the Web site's file transfer server. This mapping includes modification of each of the local links that were made to new files during the editing process. Thus, a new image added to the Web page from the user's local disk drive would be remapped to the appropriate address for the file transfer server. In step 307, the edited Web page and all of the new or modified dependent files are uploaded to the Web site through the file transfer server.

As previously disclosed, the file mapping between the HTTP address methodology and the file transfer address methodology may be implemented by concurrently-filed, commonly-owned, U.S. patent application Ser. No. 10,689, 870, entitled, "AUTOMATIC SET UP FOR EDITING A WEB SITE;" and U.S. patent application Ser. No. 10/689, 860, entitled, "CROSS-PROTOCOL URL MAPPING," the disclosures of which are incorporated herein by reference.

FIG. 4 is a flowchart illustrating example steps executed in implementing an additional embodiment of the present invention. Many modern Web sites are developed using scripting languages, such as MACROMEDIA, INC.'s COLDFUSION™ MARKUP LANGUAGE (CFML™), SUN MICROSYSTEM's JAVA™ SERVER PAGES (JSPT™), MICROSOFT CORPORATION's ACTIVE SERVER PAGES™ (ASP™), and the like, which generate HTML on the fly pulling information from databases to fill out the generated Web pages. In such cases, there is typically no pre-existing Web page to download from the file transfer server. The steps illustrated in FIG. 4 show an embodiment of the present invention that can handle these dynamically created Web pages.

In step 400, the user browses to the desired Web page to be modified. As the user browses to the specific page, the Web server runs the server-side code which generates the HTML for the Web page and pulls the information that is inserted into the Web page from a related database. In step 401, the user activates the modify function. In response to the modify function activation, the system scans the generated Web page, in step 402, to identify the elements of that Web page that were generated from the database information. The generated Web page and its dependents are then downloaded in step 403 and modified according to the user's preferences in step 404.

After completing the modifications, the user activates the publish function in step 405. In response to the publish function, the modified Web page is again scanned, in step 406, to identify the elements generated from the related database that the user modified. These modified database elements are then extracted from the Web page in step 407, after which the system uses the file transfer information to modify the content of the database in step 408. Any Web page dependents or links that may also have been added are then also updated on the Web site in step 409.

Figure 5:
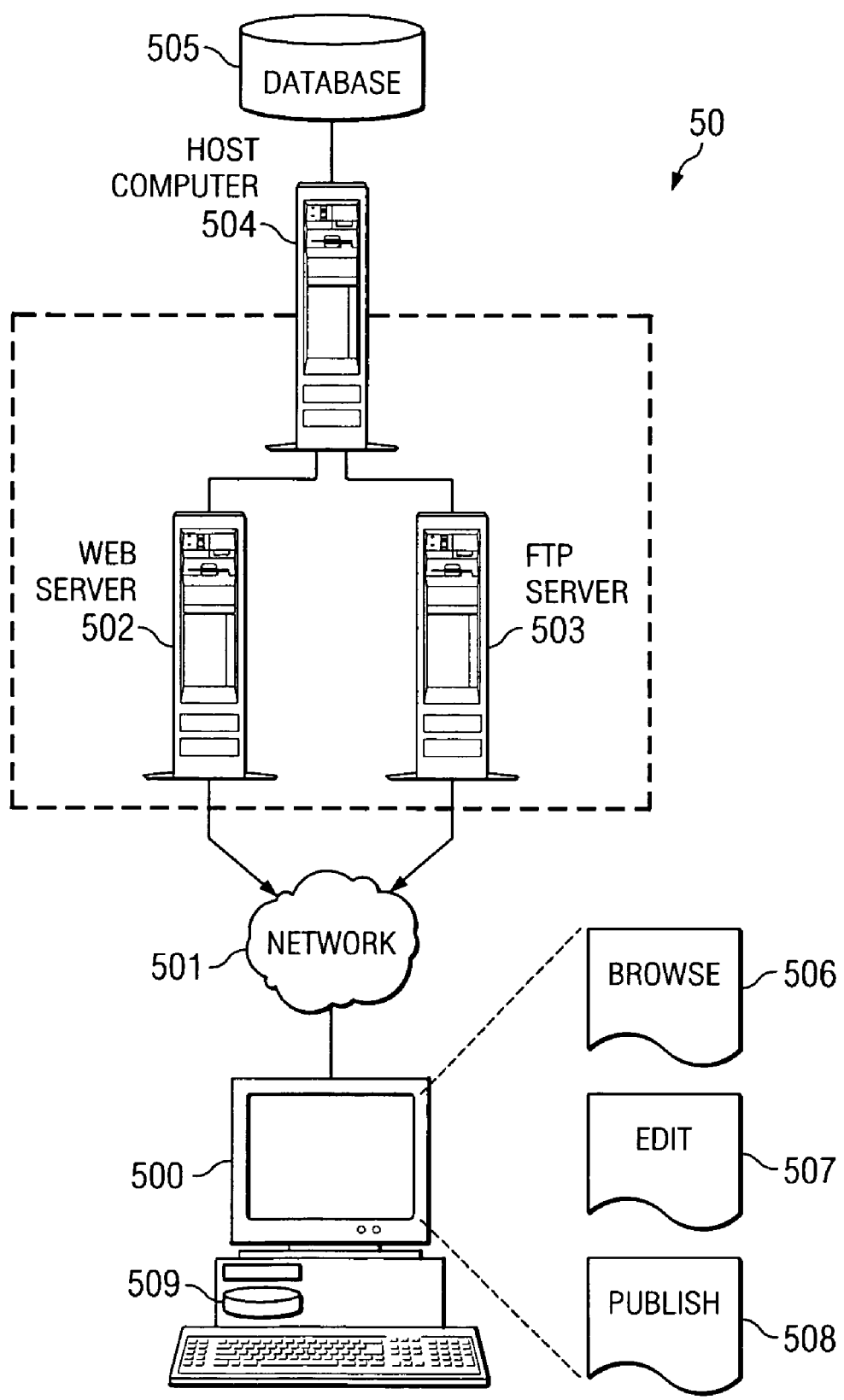
FIG. 5 is a block diagram illustrating an example system running one embodiment of the present invention.

FIG. 5 is a block diagram illustrating example Web management system 50 running one embodiment of the present invention. A complex interaction between the client-side and the server-sides occurs in implementing various embodiments of the present invention. When a user on computer 500 desires to "surf" the Internet, a connection is made between the browser running on computer 500 and Web server 502 through Internet 501. Web server 502 would contain the Web site that the user desired to visit. A typical "surfing" user at computer 500 would not generally access FTP server 503. Host computer 504 may actually be running the software that implements both Web server 502 and FTP server 503 and may also hold the underlying source files within its internal memory, or in accessible database 505.

In relation to the present invention, computer 500 runs a page editor that has been configured consistent with an embodiment of the present invention. Upon initiation of the page editor, the editor discovers the root directory corresponding to the Web site on FTP server 503. One method for implementing this task is described in concurrently-filed, commonly-owned, U.S. patent application Ser. No. 10,689, 870, entitled, "AUTOMATIC SET UP FOR EDITING A WEB SITE."

For example, as noted in the '534 patent, a development environment can ask the user to supply a file transfer server host name, login, and password, in order to be able to access and log into the file transfer server. The development environment attempts to discover the Web server root directory name or path by heuristically attempting to write test or sample files to the file transfer server using a list or database of commonly used file transfer path or root directory names. Each time a sample file is written to a specific root directory, the development environment make a hypertext transfer protocol (HTTP) request to the Web server hosting the target Web site, to view the sample file.

If the file transfer path or root directory name used was correct the Web server will return a read-only copy the correct file to the browser at the computer where the development environment is being run. However, if the path or directory name used was not correct, either an error message or a different file will be returned to the browser. The development environment recognizes this incorrect file or error message and uses the next available file transfer path or root directory name on the list. Each available common path or directory name is attempted until either the correct path or root directory is found, or the web development environment runs out of common names. When no more names are available, the user interface of the development environment resorts to requesting the correct path or root directory name from the user.

As the user enters browse mode 506, the browser embedded within the page editor establishes a connection with Web server 502 through Internet 501 to view the desired Web site. The user may then browse, through Web server 502, to the specific page that he or she desires to edit. When the user selects to enter edit mode 507, the connection with Web server 502 is maintained. The page editor scans the source file of the selected Web page, which may be viewed from Web server 502, to determine the different dependencies, links, or database 505 elements contained within the Web page. A connection is then established between computer 500 and FTP server 503 through Internet 501 to access and download the underlying source files for the Web page and its page-dependent files, links, or database 505 elements. The connection with Web server 502 may be maintained or ended. However, only the connection to FTP server 503 will be visible to the user at computer 500.

Once the appropriate files have been downloaded to computer 500, the user may edit as desired. In some cases, the user may choose to add or delete dependent files or even entire Web pages. When such files or pages are added, they would be stored locally on local storage 509. As the user edits the Web pages, the links to the appropriate new files and pages would reference the URL to local storage 509. When the user is finished editing, he or she enters publish mode 508.

Upon entry of publish mode 508, the page editor again scans the edited file for modifications in the page-dependent files, links, and database 505 elements. In preparation for uploading the edited Web page, the page editor maps all of the new documents, whether they are modifications of the existing page-dependent files or whether they are wholly new Web pages or new page-dependent files, to the appropriated location addresses for the filing system of FTP server 503. A method for implementing this cross-protocol mapping is disclosed in concurrently-filed, commonly-owned U.S. patent application Ser. No. 10/689,860, entitled, "CROSS-PROTOCOL URL MAPPING." Moreover, any links within the modified Web page to files that had been added and stored locally during the editing process will be updated to reflect the appropriate file transfer addresses appropriated for those files, or their links would be removed if the associated file was also deleted. Once this mapping has occurred, computer 500 uploads the modified Web page to its appropriated location on host computer 504 and/or database 505 through FTP server 503. This may include updating database 505 with modified, added, or deleted database elements in examples where the modified Web page is a dynamically-generated Web page. The completion of publish mode 508 returns the user automatically and seamlessly to browse mode 506, in which the connection with Web server 502 is either brought to the front again or reestablished.

For example, mapping of a URL for a Web file stored according to an HTTP server file system to the URL of that file as it is stored according to a file transfer server file system, such as an FTP server can be useful in maintaining and editing Web sites, and thus may be included as a feature in a Web development environment. The process begins with two pieces of information: the base URL of the underlying Web site and the base root directory name of that Web site on the FTP server. Both the base URL and the base root directory name may be obtained by a user, but preferred embodiments of the present invention may obtain the base URL from a user and the base root directory name automatically from a Web development environment.

As the user of the Web development environment enters the specific URL of the Web page desired to be edited, the mapping method compares the base Web site URL to the exact URL of the Web page. Any address elements that extend beyond that of the base Web site URL are stripped off as the relative address of that Web file. The address is then mapped into the file transfer URL by adding the relative address to the FTP base root directory associated with the Web site. The new address is the complete file transfer URL for the Web page file to be edited. The Web development environment may then use that file transfer URL to retrieve the appropriate file from the FTP server. Thus, the file transfer URL is determined automatically, without the user needing to have that specific information.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computing system comprising a processor and memory, wherein the computing system executes a page editing application that configures the computing system to:
   present a web browsing interface in a page editing application;
   receive input in the web browsing interface, the input identifying a web page, the input comprising entry of a URL of the identified web page or selection of a link to the identified web page;
   in response to the input, access and display the identified web page in the web browsing interface;
   in response to further input selecting an edit command in the web browsing interface, the further input received while the identified web page is displayed in the web browsing interface:
   (i) download the identified web page, wherein downloading comprises retrieving, from a second computing system, at least one file associated with display of the identified web page and storing a copy of the at least one file at the computing system,
   (ii) present a page editing interface in the page editing application, and
   (iii) receive input editing the identified web page and change the content of the stored copy of the at least one file in response to the input; and
   in response to input selecting a publish command in the page editing interface, publish the identified web page as edited by using a cross-protocol mapping to automatically determine a directory path for uploading the stored copy of the at least one file as changed and uploading the stored copy of the at least one file as changed at the computing system to a file transfer protocol server, the cross-protocol mapping created by the page editing application.

2. The computing system set forth in claim 1, wherein the page editing application configures the computing system to scan the identified web page for page-dependent related files prior to downloading, and wherein downloading the at least one file comprises downloading one or more page-dependent related files identified in the scan.

3. The computing system set forth in claim 1, wherein the page editing application configures the computing system to scan the identified web page as edited for a modification to a page-dependent file prior to uploading, and wherein uploading the stored copy of the at least one file as changed comprises uploading the modified page-dependent file.

4. The computing system set forth in claim 3, wherein the modification comprises at least one of an edit to a page-dependent file, deletion of a page-related file, and addition of a page-dependent file.

5. A computer-implemented method, comprising:
- presenting a web browsing interface in a page editing application, wherein presenting the web browsing interface in the page editing application comprises rendering a view of the page editing application for output by a display device;
- receiving input in the web browsing interface, the input identifying a web page, the input comprising entry of a URL of the identified web page or selection of a link to the identified web page;
- in response to the input, accessing the identified web page and rendering a display of the identified web page in the web browsing interface;
- receiving further input selecting an edit command in the web browsing interface while the identified web page is displayed in the web browsing interface, and in response:
  - (i) presenting a page editing interface in the page editing application,
  - (ii) receiving input editing the identified web page, and
  - (iii) in response to receiving input editing the identified web page, creating at least one file at the computing system or editing at least one file at the computing system to reflect the input editing the web page;
- receiving input selecting a publish command in the page editing interface; and
- in response to the publish command, publishing the identified web page as edited by using a cross-protocol mapping to automatically determine a directory path for uploading the stored copy of the at least one file as changed and uploading the identified web page as edited to a file transfer protocol server, the cross-protocol mapping created by the page editing application,
- wherein uploading the identified web page as edited comprises uploading the created at least one file to the file transfer protocol server or uploading the edited at least one file to the file transfer protocol server.

6. The method set forth in claim 5, further comprising:
- prior to presenting the page interface in the page editing application;
- scanning the identified web page for page-dependent related files; and, after scanning,
- downloading the identified web page by downloading, from a second computing system, different from a computing system that presents the web browsing interface, at least one file associated with display of the identified web page, including any page-dependent related files identified during scanning, and storing a copy of the at least one file at the computing system that presents the web browsing interface.

7. The method set forth in claim 5, further comprising scanning the identified web page as edited for a modification to a page-dependent file prior to uploading, and wherein uploading the at least one file as changed comprises uploading the modified page-dependent file.

8. The method set forth in claim 7, wherein the modification comprises at least one of an edit to a page-dependent file, deletion of a page-dependent file, and addition of a page-dependent file.

* * * * *